United States Patent [19]

Jarman et al.

[11] 4,152,019

[45] May 1, 1979

[54] MATERIAL HANDLING SYSTEM

[76] Inventors: Philip S. Jarman, R.R. #1, Mayne Island, B.C., Canada, V0N 2J0; Gilles A. Challe, Apt. 42, 11551 Kingfisher Dr., Richmond, B.C., Canada, V7E 3N5

[21] Appl. No.: 830,551

[22] Filed: Sep. 6, 1977

[51] Int. Cl.² .............................................. B66C 1/00
[52] U.S. Cl. ................................. 294/112; 744/137 R
[58] Field of Search ............... 294/112, 106, 111, 118; 37/184, 185, 186, 187; 212/7; 214/92, 147 G; 244/137 R

[56] References Cited

U.S. PATENT DOCUMENTS

| | | | |
|---|---|---|---|
| 2,452,452 | 10/1948 | Girnus | 294/112 |
| 2,617,211 | 11/1952 | Olson | 37/185 |
| 3,248,074 | 4/1966 | Cannon | 244/137 R |
| 3,830,507 | 8/1974 | Johnson | 294/112 |

*Primary Examiner*—James B. Marbert
*Attorney, Agent, or Firm*—Townsend and Townsend

[57] ABSTRACT

A material handling system particularly suited for lifting and transporting felled timber with a helicopter. An instrument, such as a grapple, is provided for handling and holding the material. A main winch and a main cable, windable on the winch, are provided for transporting the material within the instrument while suspended from a main point. An auxiliary winch and auxiliary cable windable on the auxiliary winch are provided for suspending the instrument from an auxiliary point. The material can be handled by the instrument below the auxiliary point and then transported while suspended from the main point. When applied to a helicopter, the main point is located under the helicopter in vertical alignment with the center of gravity of the helicopter and the auxiliary point is located under the helicopter adjacent the pilot's seat.

16 Claims, 12 Drawing Figures

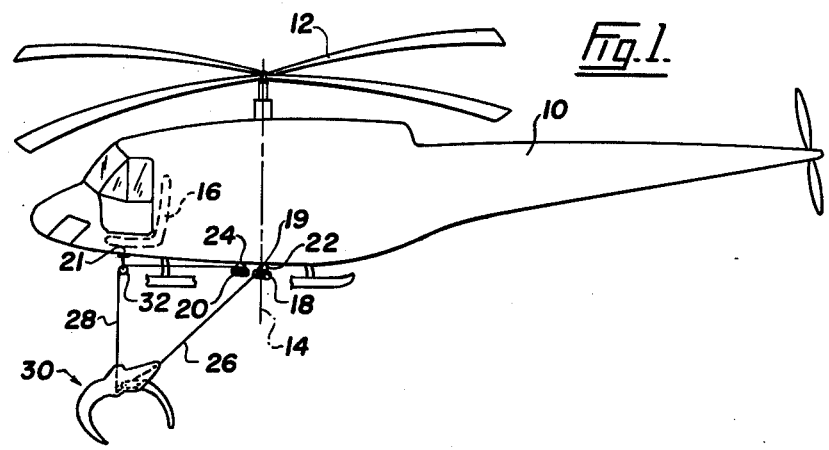
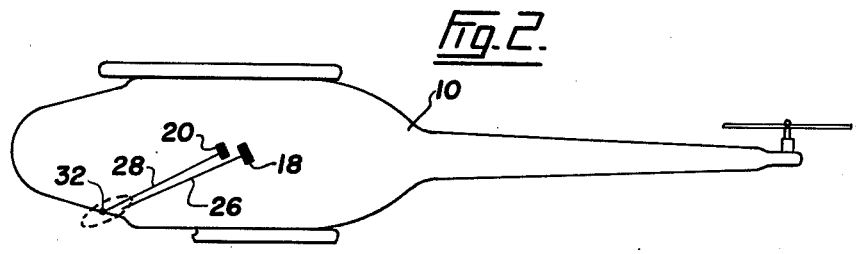
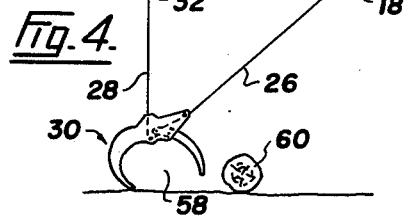
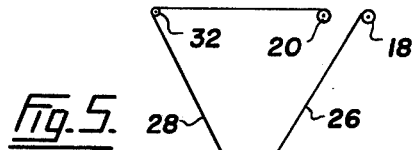
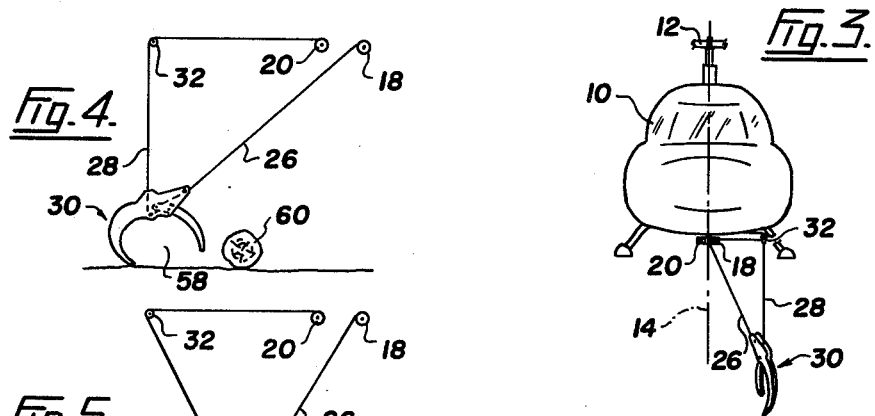
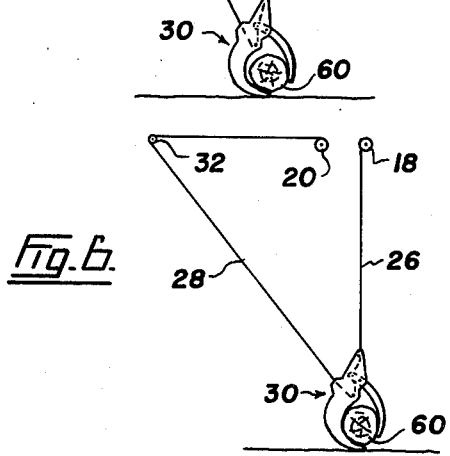
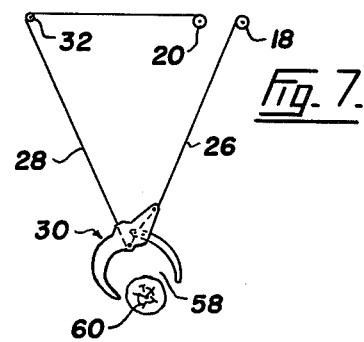

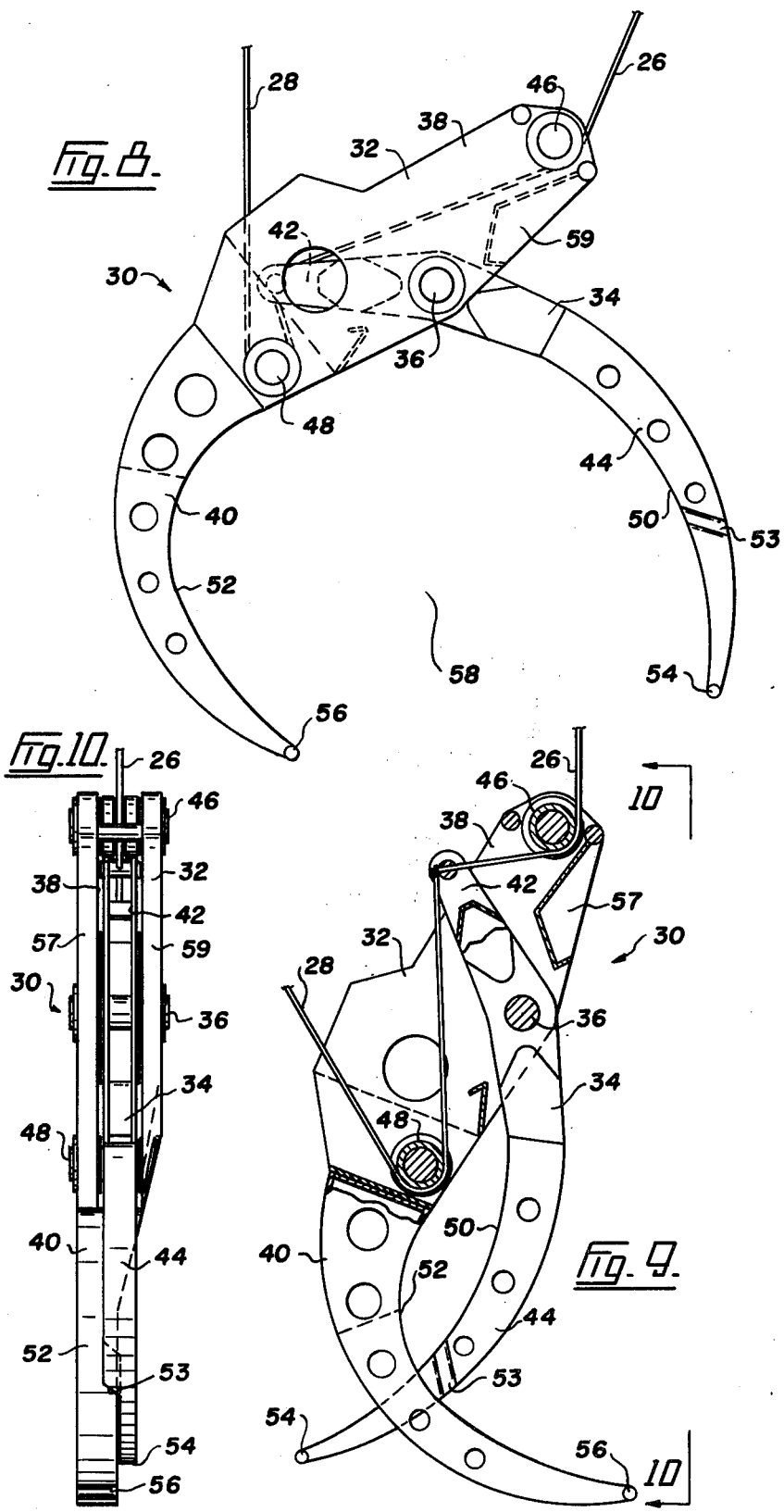

MATERIAL HANDLING SYSTEM

BACKGROUND OF THE INVENTION

This invention relates to a system whereby an instrument, such as a grapple, can load or handle material when suspended from one point and the material can be transported while the instrument is suspended from a second point.

The development of the helicopter has been a boon to the transportation of materials from or to locations where access is otherwise difficult or impossible. One application of increasing importance involves the transportation of felled timber. In many areas, the readily accessible timber has all been harvested leaving highly desirable timber in difficult locations. One solution has been to use helicopters to transport the timber from the site where it is felled to a river or other available transportation means. Since the operation of a helicopter is a very expensive proposition, it is imperative that the aircraft be put to its most efficient use. It has been the practise to have ground crews assemble groups of logs in slings which are transported by a helicopter, suspending the sling from a fixed length cable. The cable should be suspended from a point generally in vertical alignment with the centre of gravity of the helicopter in order to avoid adverse effects on the operation and controls of the helicopter. When the helicopter arrives at its point of destination, the logs are deposited along with the cable. The efficient operation of the helicopter requires a fast turn about, and there is no time to stop and retrieve the cable. Consequently, large amounts of cable are accummulated at the destination point until transported back, for example by a second helicopter, to the point where trees are felled.

SUMMARY OF THE INVENTION

According to one aspect of the invention, there is provided an apparatus for handling material at a handling position and for suspending the material from a main point. The apparatus comprises material handling means; auxiliarly suspending means for suspending the material handling means from an auxiliary point, spaced from the main point, for handling the material at the handling position and for securing the material; and main suspending means for suspending the material handling means from the main point after the material is secured.

Preferably, the main suspending means comprises a main cable connected to the material handling means, the main cable having a span between a point of attachment on the material handling means and the main point, and main means for lengthening or shortening the span of the main cable. The material handling means may be adapted to load materials by transferring the weight of the material handling means to the main cable from the auxiliary suspending means and to unload the material by transferring the weight of the material handling means from the main cable to the auxiliary suspending means.

The auxiliary suspending means may comprise an auxiliary cable connected to the material handling means, the auxiliary cable having a span extending from a point of attachment on the material handling means to the auxiliary point, and an auxiliary winch for shortening or lengthening the span of the auxiliary cable.

According to another aspect of the invention, there is provided the combination of the apparatus described above and a helicopter having a centre of gravity and a pilot's seating position. The main point is generally under, and in vertical alignment with, the centre of gravity of the helicopter, the auxiliary point being under the helicopter and generally adjacent the pilot's seating position. A pilot of the helicopter has visual access to the material handling means when the material handling and means is handling material at the handling position while suspended from the auxiliary point.

According to another aspect of the invention, there is provided an apparatus for handling and holding material and attachable to a main line and an auxiliary line. The apparatus comprises a holding part and a securing part pivotally connected to the holding part between a proximal portion and a distal portion of each part, the apparatus being adapted to secure material when the distal portion of the securing part is pivoted towards the distal portion of the holding part and to hold material when suspended by the main line only.

When the present invention is applied to a helicopter for transporting felled timber, considerable advantages are obtainable. A grapple suspended from a helicopter by a main cable and an auxiliary cable can pick up one log, or can pick up two logs lying across each other by securing them at their point of intersection. The timber may be cut in lengths equivalent to the maximum lift of the helicopter. Since the timber may be handled by the grapple in a position visible to the pilot, and the grapple may be unloaded or loaded by lengthening or shortening the cables, no ground crew is required for loading the helicopter. Besides the saving in labour and cost of the ground crew, the operation of the helicopter becomes more flexible since the timber may be picked up independently of the position of ground crews. It should also be noted that the timber is unloaded by simply opening the grapple at the required point. Consequently, there is no accummulation of steel cables at the destination point.

In the drawings which illustrate embodiments of the invention:

FIG. 1 is a side elevational view of a helicopter and material handling apparatus according to an embodiment of the invention;

FIG. 2 is a diagrammatic top plan view of the helicopter and apparatus shown in FIG. 1 showing the position of the cables;

FIG. 3 is a front elevational view of the helicopter and apparatus according to FIG. 1;

FIGS. 4 to 7 are a series of side elevational views illustrating the operation of a material handling apparatus according to an embodiment of the invention;

FIG. 8 is a side elevational view of a grapple adapted for transporting cut timber and shown in an open position;

FIG. 9 is a side elevational view of the grapple shown in FIG. 8 with the grapple closed;

FIG. 10 is a side elevational view taken along section 10—10 of FIG. 9;

DESCRIPTION OF THE PREFERRED EMBODIMENT

Figure 11:
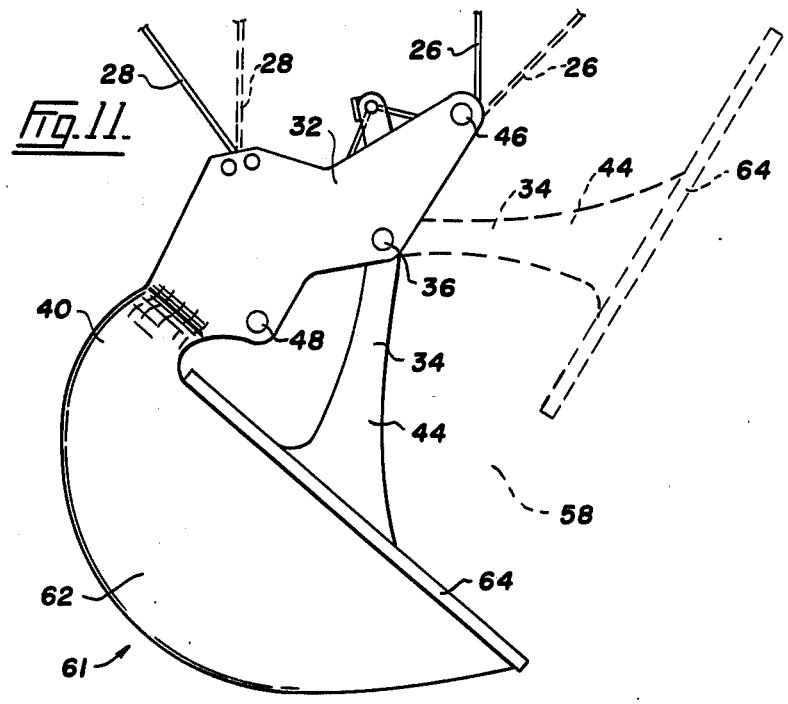
FIG. 11 is a side elevational view of a bucket for loading and transporting loose material according to an embodiment of the invention.

In the drawings, like parts have like numbers. FIGS. 1 to 3 illustrate a helicopter 10 having a main rotor 12 rotatable about an axis of rotation 14, which passes through the centre of gravity of the helicopter. A pilot's seating position 16 is located in the forward part of the helicopter 10. Main winch 18 and auxiliary winch 20 are connected to the under body of the helicopter by struts 22 and 24 respectively. Main cable 26 is windable on main winch 18 and auxiliary cable 28 is windable on auxiliary winch 20. As may be seen, main winch 18 is located generally along the axis of rotation 14 of the main rotor 12, and, consequently is in vertical alignment with the centre of gravity of the helicopter. Auxiliary winch 20 is located just forwards of main winch 18. The end of main cable 26 distal the winch 18 is connected to grapple 30 for handling material. Additionally, auxiliary cable 28 passes through sheave 32, which is attached to the under body of the helicopter to one side of the pilot's seating position 16, and the end of the auxiliary cable 28 distal the auxiliary winch 20 is connected to the grapple 30.

In the present embodiment, both main winch 18 and auxiliary winch 20 are hydraulically operated winches equipped with brakes. The lifting capacity of main winch 18 need only equal the weight of the grapple 30 plus the weight of main cable 26 plus a margin of approximately 500 pounds. The braking capacity of main winch 18 must, however, equal the weight of the grapple 30 plus the weight of the main cable 26 plus the weight of the timber to be carried. In the present embodiment, the braking capacity of main winch 18 is approximately 25,000 pounds. Main winch 18 is operational in two modes. In the "Reel In" mode, the brake of the main winch 18 is released and the winch reels in. In the "Reel Out" mode the amount of braking force can be controlled and, consequently, the rate of cable reeling out can be controlled between zero and free fall. When neither the reel in mode nor reel out mode is selected, the winch brake is automatically and fully applied.

The tension applied to auxiliary cable 28 by auxiliary winch 20 can be varied between approximately 0 and 600 pounds. The auxiliary winch 20 has a braking capacity of approximately 1,500 pounds. Auxiliary winch 20 is operational in three modes. In the "Brake On" mode, the winch brake is fully applied, the brake will support approximately 1,500 pounds, and then auxiliary cable 28 will pay out from auxiliary winch 20. In the "Brake Off/Drag On" mode, the winch brake is off and the appropriate tension between 0 and 600 pounds may be applied to auxiliary cable 28 by auxiliary winch 20. A clutch is provided on auxiliary winch 20 to regulate the drag. In the "Brake Off/Drag Off/Momentary Release" mode, the controls selecting the tension applied by the winch are momentarily overidden, and the brake is released, thereby allowing the auxiliary cable 28 to fall slack so that the weight of the grapple 30 is transferred to the main cable 26, as explained below, closing grapple 30.

While the controls for the main winch 18 and the auxiliary winch 20 and the brake for the winches do not form part of the present invention, these controls are preferably placed for easy access by the pilot of the helicopter for simultaneous use with the helicopter controls. The "Reel In" mode of operation of the main winch may be selected by a pressure button on the cyclic control of the helicopter. When the button is pushed, the main winch brake is released and the winch reels in. The brake of the main winch is automatically applied when the button is released.

The "Reel Out" mode of the main winch may be selected by a variable pressure button on the cyclic control. Increasing pressure on the button decreases the braking force on the main winch and adjusts the rate of main cable reel out.

The "Brake On" and "Brake Off/Drag On" modes of operation of the auxiliary winch may be selected by a two position toggle switch. When the latter mode is selected the amount of tension applied to the auxiliary cable by the auxiliary winch is regulated by a hydraulic valve in the cockpit of the helicopter.

The "Brake Off/Drag Off/Momentary Release" mode of operation of the auxiliary winch may be selected by a pressure button on the collective control of the helicopter.

As seen in FIGS. 8 to 10 the grapple 30 has a holding part 32 and securing part 34. The securing part 34 is pivotally connected to the holding part 32 by pin 36. Pin 36 defines a proximal portion 38 of holding part 32 proximal the cable 26 and a distal protion 40 of the holding part 32 distal the cable 26. Pin 36 also defines proximal portion 42 of securing part 34 proximal cable 28 and distal portion 44 of securing part 34 distal the cable 28. Sheave assembly 46, on proximal portion 38 of holding part 32, serves as a guide for main cable 26. Sheave assembly 48 on the distal portion 40 of holding part 32 serves as a guide for auxiliary cable 28. Securing part 34 and holding part 32 have concave sides 50 and 52, respectively, facing each other. Distal portion 44 of securing part 34 and distal portion 40 of holding part 32 are generally pointed at ends 54 and 56 respectively. As may be best seen in FIG. 10, the portion of holding part 32 between sheave assemblies 46 and 48 is bifurcated forming side by side parts 57 and 59. Proximal portion 42 of securing part 34, and a part of distal portion 44 of securing part 34 adjacent pin 36, are pivotal between parts 57 and 59 on pin 36. The parts of distal portions 44 and 40 adjacent ends 54 and 56 respectively overlap in a scissors-like manner when grapple 30 is closed, as shown in FIG. 9 and FIG. 10.

As may be appreciated from FIG. 8, as the main cable 26 moves towards the grapple 30 through sheave assembly 46 and auxiliary cable 28 moves away from grapple 30 through sheave assembly 48, proximal portion 42 of securing part 34 pivots towards sheave assembly 48. An opening 58 is formed when points 54 and 56 are spaced apart. The maximum width of opening 58 is achieved when main cable 26 is slack and the grapple 30 is suspended by auxiliary cable 28 alone. In this position, as shown in FIG. 8, opening 58 faces generally downwards so that material such as a log will pass through opening 58 as grapple 30 moves downwards. As main cable 26 moves from grapple 30 through sheave assembly 46, and auxiliary cable 28 moves towards grapple 30 through sheave assembly 48, proximal portion 42 of securing part 34 pivots towards sheave assembly 46. The pivoting of proximal portion 42 towards sheave 46 continues until stopped, either by a log interposed between concave sides 50 and 52 of securing part 34 and holding part 32 respectively, or until stop 53 of securing part 34 contacts holding part 32. As proximal portion 42 moves towards sheave assembly 46, point 56 of holding part 32 moves under, for example, the log, holding part 32 moves to a concave side 52 upwards position for holding the log, and securing part 34 moves the log onto holding part 40. After opening 58 is closed, as shown in FIGS. 9 and 10, distal portion 44 of securing part 34 overlaps the distal portion 40 of the holding part 32.

FIG. 11 shows a scoop 61, for loose materials, generally similar in configuration to grapple 30. Like parts are numbered the same. Distal portion 40 of holding part 32 has a bucket 62 attached thereto. Distal portion 44 of securing part 34 has a flap-like cover 64 for bucket 62. The operation of scoop 61 is similar to grapple 30, flap 64 moving away from bucket 62 to provide an opening 58 as auxiliary cable 28 moves away from scoop 61 through sheave assembly 48. As proximal end 42 of securing part 34 approaches sheave assembly 48, and the scoop 61 is suspended from auxiliary cable 28, opening 58 increases in width and faces generally downwards towards the loose material. After scoop 62 is lowered onto the loose materials main cable 26 is moved away from scoop 61 through sheave assembly 46, thus moving cover 64 towards bucket 62 and pushing the materials into the bucket 62 as bucket 62 moves to an upward facing position. After cover 64 closes bucket 62, scoop 61 containing the materials may be lifted and transported by main cable 26 alone.

Figure 12:
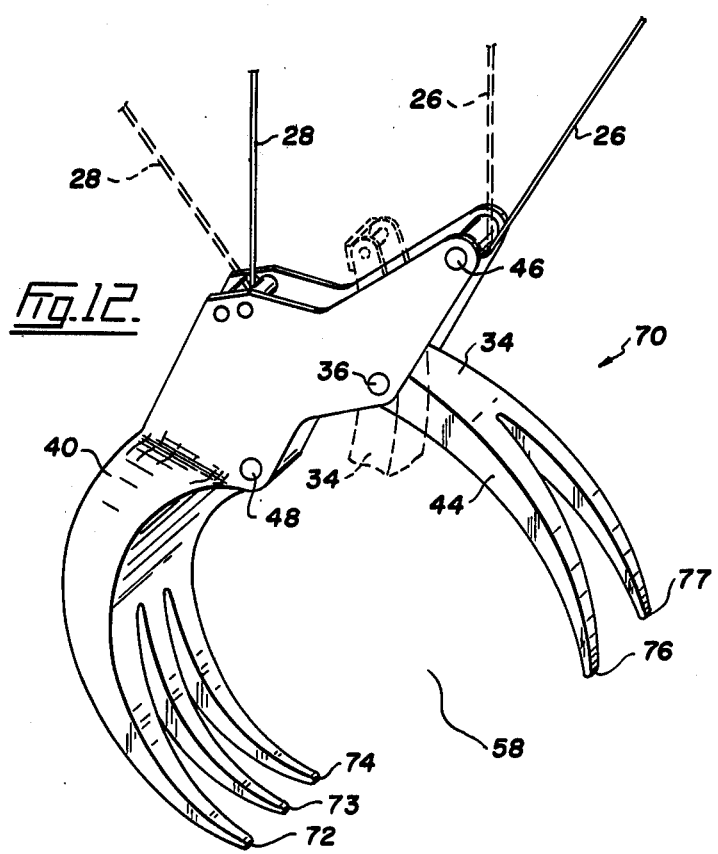
FIG. 12 is a side elevational view of a mechanical hand according to an embodiment of the invention.

FIG. 12 shows a mechanical hand 70 generally similar in construction to grapple 30 and the like parts are numbered the same. In mechanical hand 70, distal portion 40 of holding part 32 has holding fingers 72, 73, and 74. Additionally, dital portion 44 of securing part 34 comprises fingers 76 and 77. When the materials to be transported have been placed between distal portions 40 and 44, opening 58 is closed by moving main cable 26 away from sheave assembly 46. This causes fingers 72, 73 and 74 to move under the material to be transported. After opening 58 is closed, continued movement of the main cable 26 away from sheave assembly 46 causes finger 76 to pass between fingers 72 and 73 and causes finger 77 to pass between fingers 73 and 74. The pivoting of holding part 32 and securing part 34 about bolt 36 is stopped by either proximal portion 42 of securing part 34 contacting sheave assembly 46, or by the material to be transported contacting distal portions 40 and 44.

FIGS. 4 to 7 illustrate a method for handling and transporting cut timber 60 at handling a position by a helicopter employing material handling and holding means such as grapple 30 as shown in FIGS. 8 to 10. It may be seen that either scoop 62 or mechanical hand 70, as shown in FIGS. 11 and 12, could be employed in a similar manner for handling and transporting other types of materials. A typical system for handling and transporting timber is capable of handling sections of cut timber 60 weighing up to 8,000 lbs. In such a case, as mentioned above, main winch 18 should have a braking capacity of 25,000 lbs. to provide a sufficient safety margin for acceleration forces occuring during transportation of timber 60 by helicopter. It should be noted that main winch 18 needn't provide a reeling-in force as great as 25,000 pounds. Main cable 26 is for suspending grapple 20 and timber 60 from the main point 19 shown in FIG. 1 for and lifting the grapple 30 towards main point 19. Auxiliary cable 26 is for suspending grapple 30 from auxiliary point 21 shown in FIG. 1 and for locating grapple 30 vertically below auxiliary point 21.

FIG. 4 shows the position of the apparatus preparatory to securing and lifting timber 60. The lengths of the main cable 26 and auxiliary cable 28 have been adjusted so that the weight of grapple 30 is transferred to auxiliary cable 28 and grapple 30 is generally in vertical alignment with sheave 32. Main winch 18 is non-operational and its brake is fully applied. Auxiliary winch 20 is in the "Brake On" mode of operation.

FIG. 5 shows the position of the apparatus after timber 60 has been moved through the opening 58, as shown in FIG. 8. This has been achieved by firstly moving the helicopter rearwardly while the brakes on both main winch 18 are auxiliary winch 20 remain fully applied. The grapple 30 is then closed around logs 60 by selecting the "Brake Off/Drag Off/Momentary Release" mode of operation of auxiliary winch 20. The helicopter then moves upwards by operation of its collective control, the weight of the grapple 30 and logs 60 being transferred to main cable 26, and the main cable 26 moving away from grapple 30 through sheave assembly 46, shown in FIG. 8, as the helicopter 10 continues lifting. Alternatively, the grapple 30 may be closed by choosing the "Brake On" mode of the auxiliary winch 20, the "Reel In" mode of main winch 18, and decreasing the altitude of the helicopter 10 by means of its collective control. A third alternative for closing the grapple 30 is to choose the "Brake Off/Momentary Release" mode of auxiliary winch 20 and the "Reel In" mode of main winch 18 without changing the collective control of the helicopter.

After grapple 30 is closed, the "Brake Off/Drag On" mode of operation of auxiliary winch 20 is selected, and some tension is applied to auxiliary cable 28 by auxiliary winch 20, but not sufficient force to prevent auxiliary cable 28 from unwinding from auxiliary winch 20 as the weight of the grapple 30 and timber 60 is transferred to main cable 26. As shown in FIG. 5 the auxiliary winch 20 is in the "Brake Off/Drag On" mode of operation and the helicopter 10 maintains tension on main cable 26 by lifting upwards as the helicopter 10 centres itself until grapple 30 is generally in vertical alignment with main winch 18 and the axis of rotation 14 of the main rotor 12. It is then necessary to adjust the length of the main cable 26 below main winch 18 so that grapple 30 and timber 60 are the required distance below the helicopter 10 for transportation of the timber 60. This is achieved, as shown in FIG. 6, by reeling out main cable 26 from the main winch 18, as helicopter 10 lifts upwards, and while auxiliary winch 20 maintains some tension on auxiliary cable 28. For this purpose winch 18 is in the "Reel Out" mode of operation and auxiliary winch 20 is in the "Brake Off/Drag On" mode of operation.

For transportation, the brake on main winch 18 is fully applied while auxiliary winch 20 remains in the "Brake Off/Drag On" mode and maintains some tension on auxiliary cable 28 to stabilize the log 60. The helicopter moves away from the ground and transports the timber 60 to the required position. It should be noted that only the braking force of the main winch 18 is required to support the full weight of the load.

As illustrated in FIG. 7, once the timber 60 is transported to the required site, the "Brake On" mode of auxiliary winch 20 is selected, the "Reel Out" mode of main winch 18 is selected, releasing the brake so main cable 20 reels out, slowly transferring the weight of the grapple 30 to auxiliary cable 28. Once sufficient weight has been transferred to auxiliary cable 28, the grapple opens releasing timber 60. This occurs because auxiliary cable 28 moves away from grapple 30 to the position shown in FIG. 8.

It is then necessary to position grapple 30 for travel back to a place for picking up more timber. Firstly, the "Brake Off" mode of auxiliary winch 20 is selected so that the grapple swings back to a position under main winch 18. The "Reel In" mode of main winch 18 is selected to reel in main cable 26 while the auxiliary cable 28 follows on auxiliary winch 20. In the position for travel the brakes are fully applied on main winch 18 and auxiliary winch 20 is the "Brake Off/Drag On" mode. When the helicopter 10 reaches the site to pick up more timber, the position shown in FIG. 4 is resumed. Main cable 26 is reeled out from main winch 18 by selecting its "Reel out" mode, thus positioning grapple 30 below pulley 32, and opening grapple 30 as auxiliary cable 28 moves away from grapple 30 through the auxiliary chive assembly 48 shown in FIG. 8.

It should be noted that other material handling and holding means, besides of the grapple, scoop, and mechanical hand as described, could be employed with the material handling apparatus. For example, an ordinary hook can be employed.

In certain applications, other means could be used for suspending the material handling and holding means from the main point besides the main cable and main winch as described. The length of the cable could be adjusted with a hydraulic or pneumatic cylinder, for example.

In alternative embodiments, the main cable could be of a fixed length and the apparatus could be operated by varying the length of the auxiliary cable only. In this case, the main winch would be omitted and replaced by an attachment point in vertical alignment with the center of gravity of the helicopter. In this case, the main cable could be replaced by a chain or a rigid linkage pivotally connected near the main point and to the material handling and holding instrument.

Similarly, the auxiliary winch could be replaced by a hydraulic or pneumatic cylinder or other means of varying the length of the auxiliary cable. The auxiliary cable could be of a fixed length and the material handling and holding instrument could be moved between a position generally below the main point and a position generally below the auxiliary point by varying the length of the main cable only. In this case, the auxiliary cable could also be placed by a chain or other linkage, for example a rod pivotally connected at one end to the auxiliary point and pivotally connected to the material handling and holding instrument at the other end.

It should be noted, however, that a considerable advantage is lost when two winches, such as the main winch and auxiliary winch described above, are not used. It is mentioned above that the main winch need not have a lifting capacity sufficient to lift the load carried by the grapple as well as the grapple itself. This advantage applied only to the arrangement implying the two winches as described above.

In another alternative embodiment, the main winch and auxiliary winch as well as other equipment, such as hydraulic pumps, could be placed on a platform detachably suspended below the helicopter. This embodiment could be desirable where a specially adapted helicopter would not be practical.

In a further alternative embodiment, the winch could be electrically operated rather than hydraulically operated as described above.

In the illustrated embodiments the winches 18 and 20 are shown exterior to the body of helicopter 10. It should be understood that the winches could be located within the helicopter 10 with the cables 26 and 28 passing through suitable apertures and guides in the body of the helicopter 10. This embodiment may be preferable where a helicopter is to be used to a large extent for handling material as herein described.

In a further alternative embodiment, a single winch may be employed to replace the two winches 18 and 20. The single winch would preferably located between the main point 19 and the auxiliary point 21. The advantage relating to the use of two separate winches are retained.

What I claim is:

1. An apparatus for handling the material, the apparatus being attachable to a main line and an auxiliary line, the apparatus comprising:
   a holding part;
   a securing part pivotally connected to the holding part between a proximal portion and a distal portion of each part, the apparatus being adapted to secure material when the distal portion of the securing part is pivoted towards the distal portion of the holding part and to hold the material when suspended by the main line only, the main line and the auxiliary line being attachable to the proximal portion of the securing part of the apparatus;
   an auxiliary guide on the distal portion of the holding part, whereby movement of the auxiliary line away from the apparatus through the auxiliary guide moves the proximal portion of the securing part towards the auxiliary guide and moves the distal portions of the parts apart for unloading material or preparing to load material; and
   a main guide on the proximal portion of the holding part, whereby movement of the main line away from the apparatus through the main guide moves the distal portion of the securing part towards the distal portion of the holding part for securing the material.

2. An apparatus as claimed in claim 1, wherein:
   when the main line is slack and the auxiliary line suspends the apparatus, the proximal portion of the securing part is generally adjacent the auxiliary guide, the distal portions of the apparatus are spaced apart forming an opening, facing generally downwards, towards material, and the material can pass through the opening between the distal portions of the apparatus; and
   as the main line moves away from the apparatus and auxiliary line moves towards the apparatus, the distal portion of the holding part tends to pass under the material, the holding portion tends to move to a material holding orientation, and the distal portions of the parts move towards each other tending to move the material into position within the apparatus.

3. An apparatus as claimed in claim 2, wherein the apparatus is a grapple, the holding part and securing part comprising two arms, the arms being concave towards each other and having generally pointed ends on the distal parts.

4. An apparatus as claimed in claim 2, wherein the apparatus comprises a scoop for loose materials, the holding part comprising a bucket and the securing part comprising a flap-like cover for the bucket.

5. An apparatus as claimed in claim 3, the apparatus comprising a mechanical hand, the securing part and holding part having a plurality of interacting fingers.

6. An apparatus for handling and transporting material comprising:
   a helicopter having a center of gravity, a main suspending point generally under, and in vertical alignment with, the center of gravity and an auxiliary suspending point under the helicopter and generally adjacent a pilot's seating position;

a main winch connected to the helicopter;

a main cable connected to the main winch with means for suspending the main cable from the helicopter below the main point;

an auxiliary winch connected to the helicopter;

an auxiliary cable connected to the auxiliary winch with means for suspending the auxiliary cable from the helicopter below the auxiliary point; and a material handling instrument connected to the main cable and the auxiliary cable and adapted to handle material when suspended by the auxiliary cable below the auxiliary point and to hold the material when suspended by the main cable below the main point.

7. An apparatus as claimed in claim 6, wherein the material handling instrument is adapted to load materials by transferring the weight of the material handling instrument to the main cable from the auxiliary cable and to unload materials by transferring the weight of the material handling instrument from the main cable to the auxiliary cable.

8. An apparatus as claimed in claim 6, wherein the apparatus is adapted to for transporting cut timber, the material handling instrument comprising a grapple having a holding arm and a securing arm pivotally connected between a proximal portion and a distal portion of each arm, the securing arm having a concave side facing a concave side of the holding arm and each arm having a generally pointed end on the distal portion.

9. An apparatus as claimed in claim 8, wherein the main cable and auxiliary cable are connected to the proximal portion of the securing arm, and including;

an auxiliary guide on the distal portion of the holding arm for guiding the auxiliary cable, whereby movement of the auxiliary cable away from the grapple moves the proximal portion of the securing arm towards the auxiliary guide and moves the distal portions of the arms apart for unloading timber or positioning the arms of the grapple about timber; and a main guide on the proximal portion of the holding arm for guiding the main cable, whereby movement of the main cable, away from the grapple through the main guide, moves the proximal end of the securing arm towards main guide and brings the distal portions of the arms together for securing the timber.

10. An apparatus as claimed in claim 9, wherein:

when the main cable is slack and the auxiliary cable suspends the grapple from the auxiliary guide, the proximal portion of the securing arm is generally adjacent the auxiliary guide, and the distal ends of the arms are spaced apart forming a generally downwardly facing opening, so the timber passes through the opening as the grapple is moved downwards towards the timber; and as the main cable is shortened relative to the auxiliary cable, the distal portion of the housing arm tends to pass under the log, the holding arm tends to move to a concave side upwards position, and the distal ends of the arms move towards each other, tending to move the timber onto the distal portion of the holding arm.

11. An apparatus for handling material at a handling position and transporting the material from the handling position, the apparatus comprising:

a helicopter having a pilot's seating position and a main rotor rotatable about an axis of rotation;

a main cable extendable from a main point under the helicopter and generally along the axis of rotation of the main rotor;

a main winch connected to the helicopter for winding the main cable;

an auxiliary cable extendable from an auxiliary point under the helicopter generally adjacent the pilot's seating position, whereby visual access is provided from the pilot's seating position to the handling position when the auxiliary point is in vertical alignment with the handling position;

an auxiliary winch connected to the helicopter for winding the auxiliary cable;

an instrument for securing the material and holding the material while the material is being transported by the helicopter, the instrument being movable to a position for securing the material below the auxiliary point, and in vertical alignment with the auxiliary point, by transferring the weight of the instrument from the main cable to the auxiliary cable, the instrument being adapted to secure the material for transportation while generally in vertical alignment with the main point and the axis of rotation of the main rotor by transferring the weight of the instrument and the material to the main cable from the auxiliary cable, the instrument being adapted to unload material by transferring the weight of the instrument from the main cable to the auxiliary cable.

12. An apparatus as claimed in claim 11, wherein the instrument is a grapple comprising:

a holding part;

a securing part connected to the holding part by a pivot between a proximal portion and a distal portion of each part, the main cable and auxiliary cable being connectable to the proximal portion of the securing part;

a main guide for the main cable on the proximal portion of the holding part;

an auxiliary guide for the auxiliary cable on the distal portion of the holding part, the proximal portion of the securing part being pivotable between the main guide and the auxiliary guide, movement of the auxiliary cable away from the grapple while the main cable moves towards the grapple causing the proximal portion of the securing part to pivot towards the auxiliary guide, while moving the distal portions apart, to provide a generally downwardly facing opening for placing the grapple about the material to be transported when the grapple is suspended by the cable, movement of the main cable away from the grapple, while the auxiliary cable moves towards the grapple, causing the proximal portion of the securing part to move towards the main guide while moving the distal portions of the grapple together and securing the material within the grapple.

13. A method of handling material with a helicopter, the helicopter having a center of gravity and a pilot's seat, the method comprising:

providing a main winch with a main cable suspendable from a main point under the helicopter and generally in vertical alignment with the center of gravity of the helicopter;

providing an auxiliary winch with an auxiliary cable suspendable from the auxiliary point under the helicopter and generally adjacent the pilot's seat;

attaching a material handling instrument to the main cable and the auxiliary cable, the material handling instrument being adapted to load materials in an open position when the main cable is shortened relative to the auxiliary cable and being adapted to unload material from a closed position when the main cable is lengthened relative to the auxiliary cable;

moving the material handling instrument to a position under, and generally in vertical alignment with, the auxiliary point by transferring the weight of the material handling instrument to the auxiliary cable from the main cable and thereby putting the material handling instrument in a material receiving position;

moving the material handling instrument to a position generally adjacent the material by movement of the helicopter;

transferring the weight of the material handling instrument to the main cable, thereby securing material within the material handling instrument;

continuing to transfer the weight of the material and the material handling instrument to the main cable from the auxiliary cable whereby the material and the material handling instrument become generally vertically aligned with the main point and the center of gravity of the helicopter; and moving the helicopter upwards and transporting the material, the material being suspended generally below the center of gravity of the helicopter by the main cable.

14. A method as claimed in claim 13, including maintaining tension on the auxiliary cable when transporting the material to stabilize the material handling instrument and the material below the main point.

15. A method as claimed in claim 13, including unloading the material by transferring the weight of the material handling instrument from the main cable to the auxiliary cable.

16. A method as claimed in claim 13 adapted for transporting cut timber, wherein the material handling instrument comprises a grapple adapted to open when the main cable is lengthened relative to the auxiliary cable, to close around and secure timber when the main cable is shortened relative to the auxiliary cable, and to hold the material when suspended by the main cable only, the method comprising moving the helicopter upwards and lengthening the main cable and the auxiliary cable after the timber and grapple are in vertical alignment with the center of gravity of the helicopter until the timber is a required distance from the helicopter for transporting the timber, and then preventing rotation of the main winch so that continued upward movement of the helicopter lifts the timber.

* * * * *